United States Patent [19]
Acevedo

[11] Patent Number: 5,649,385
[45] Date of Patent: Jul. 22, 1997

[54] INSECT TRAP AND METHOD

[76] Inventor: Michael J. Acevedo, 1044 E. Jedburgh St., Glendora, Calif. 91740

[21] Appl. No.: 307,903

[22] Filed: Sep. 16, 1994

[51] Int. Cl.[6] ..................................................... A01M 1/14
[52] U.S. Cl. ................................................................ 43/114
[58] Field of Search ............................... 43/107, 114, 121

[56] References Cited

U.S. PATENT DOCUMENTS

| | | | |
|---|---|---|---|
| 3,023,539 | 3/1962 | Emerson | 43/114 |
| 3,913,259 | 10/1975 | Nishimura | 43/114 |
| 4,044,495 | 8/1977 | Nishimura | 43/114 |
| 4,244,134 | 1/1981 | Otterson | 43/114 |
| 4,425,731 | 1/1984 | Orlando | 43/114 |
| 4,485,581 | 12/1984 | Roccaforte | 43/114 |
| 4,709,503 | 12/1987 | McQueen | 43/114 |
| 4,829,702 | 5/1989 | Silvandersson | 43/114 |
| 4,876,823 | 10/1989 | Brunetti | 43/114 |
| 5,022,179 | 6/1991 | Olson | 43/114 |
| 5,384,981 | 1/1995 | Cohen | 43/114 |
| 5,394,640 | 3/1995 | Musket | 43/114 |

FOREIGN PATENT DOCUMENTS

| | | | |
|---|---|---|---|
| 520091 | 9/1976 | U.S.S.R. | 43/114 |
| 2180135 | 3/1987 | United Kingdom | 43/114 |

*Primary Examiner*—Kurt Rowan
*Attorney, Agent, or Firm*—John J. Connors; Connors & Assoc.

[57] ABSTRACT

Disclosed is an insect trap adapted to be folded for storage and unfolded for use. In the folded condition, the trap is in a substantially flat, planar configuration, and in the unfolded condition it has a box-like configuration with an exterior surface, a top, an internal chamber, and an entryway to the internal chamber in the top. The internal chamber has a sticky substance therein that captures insects on contact, and an adhesive strip on the exterior of the trap that allows the trap to be removably attached to a surface area.

3 Claims, 5 Drawing Sheets

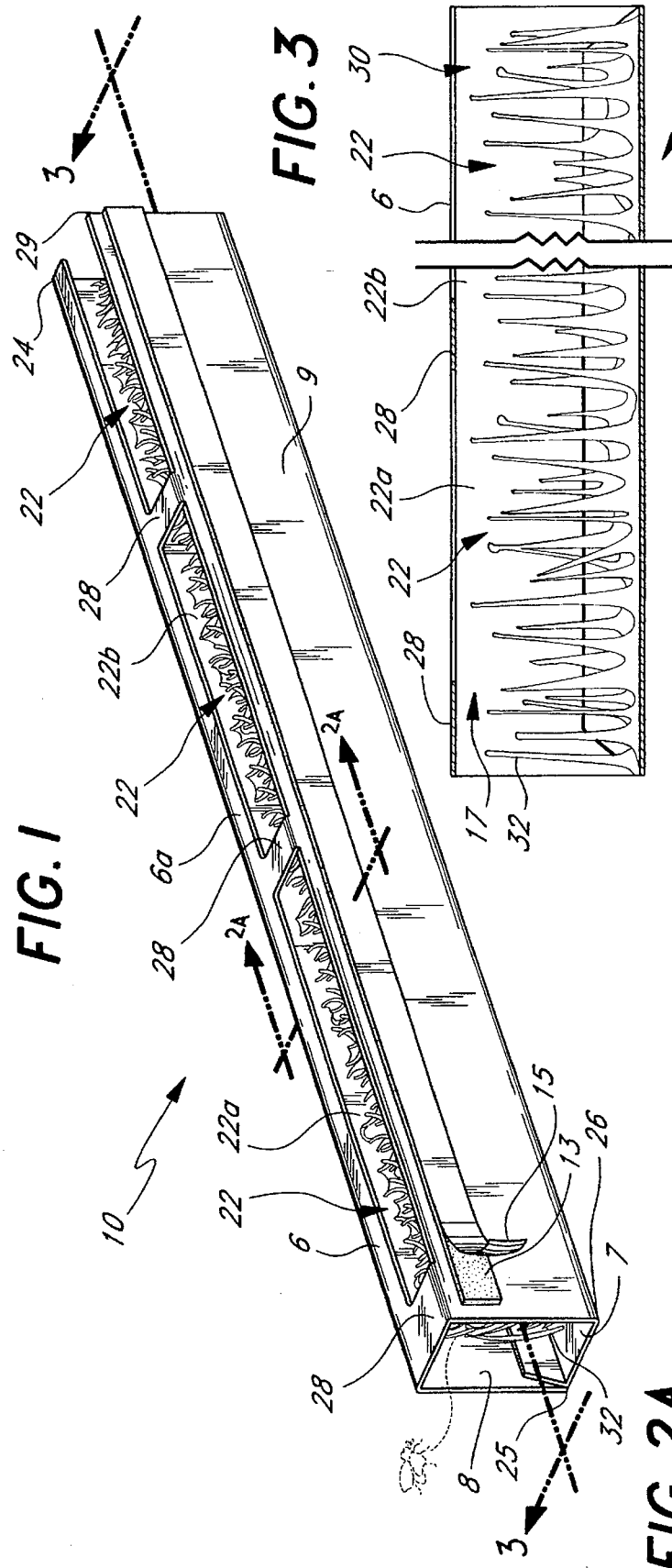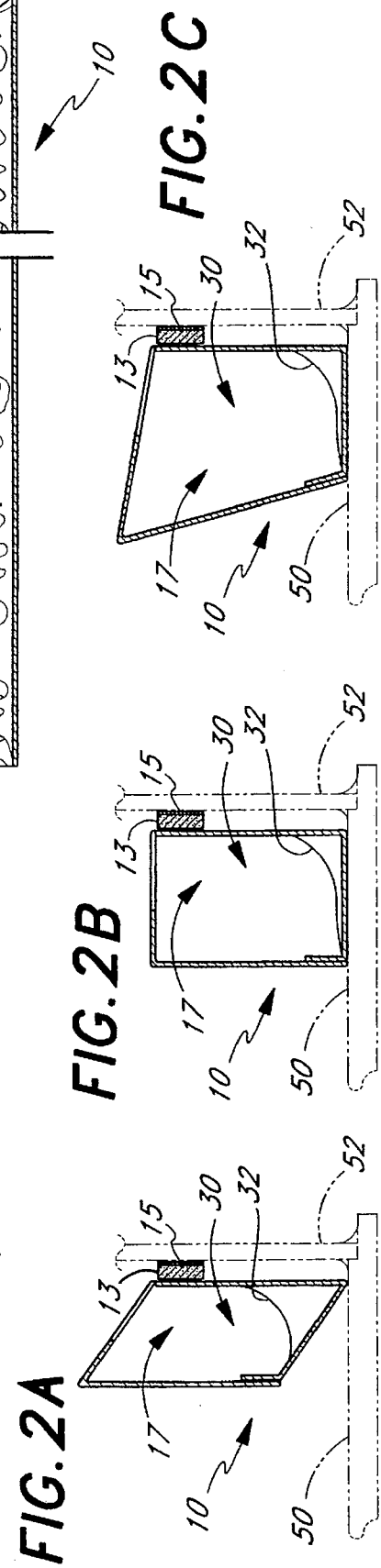

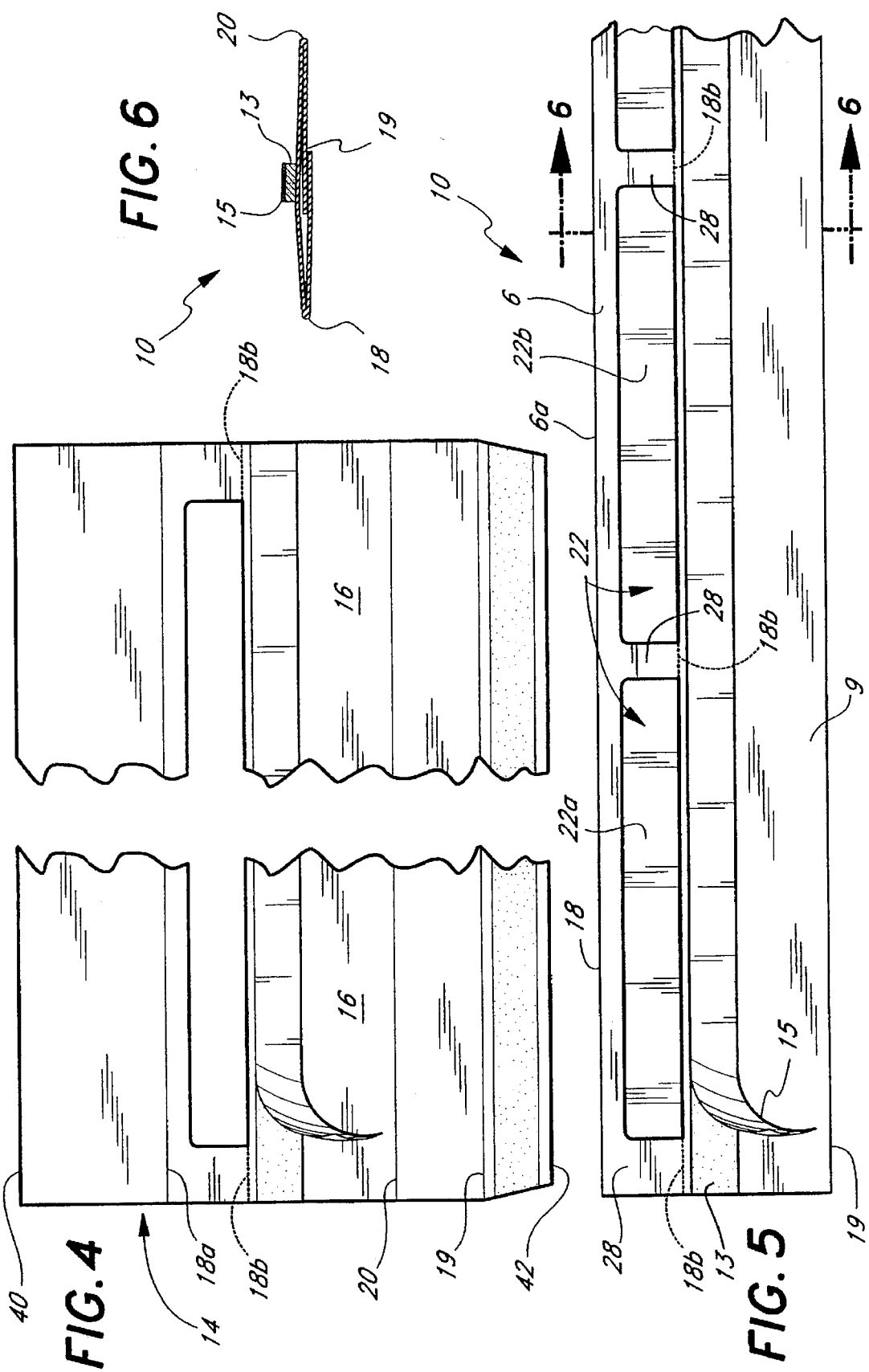

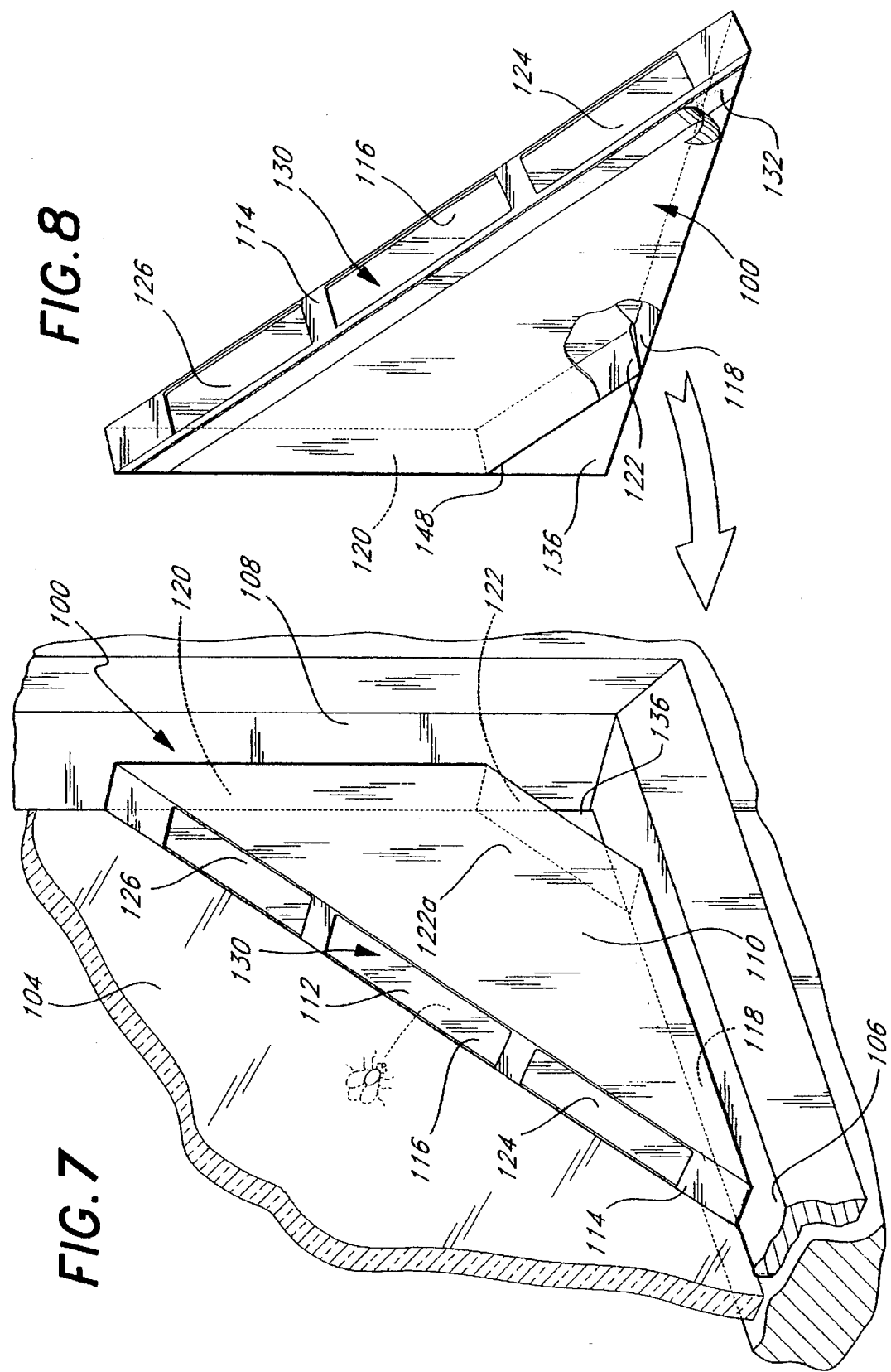

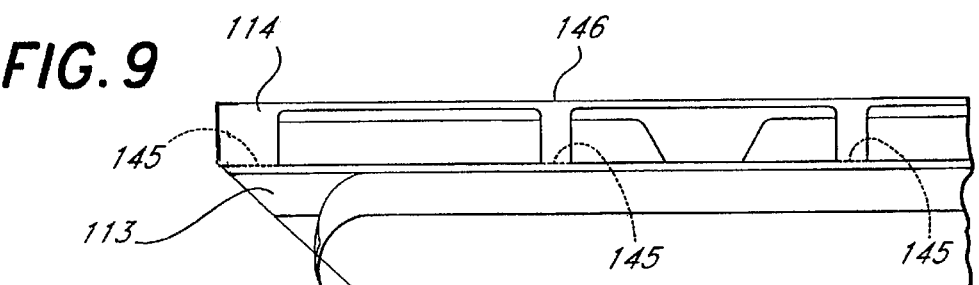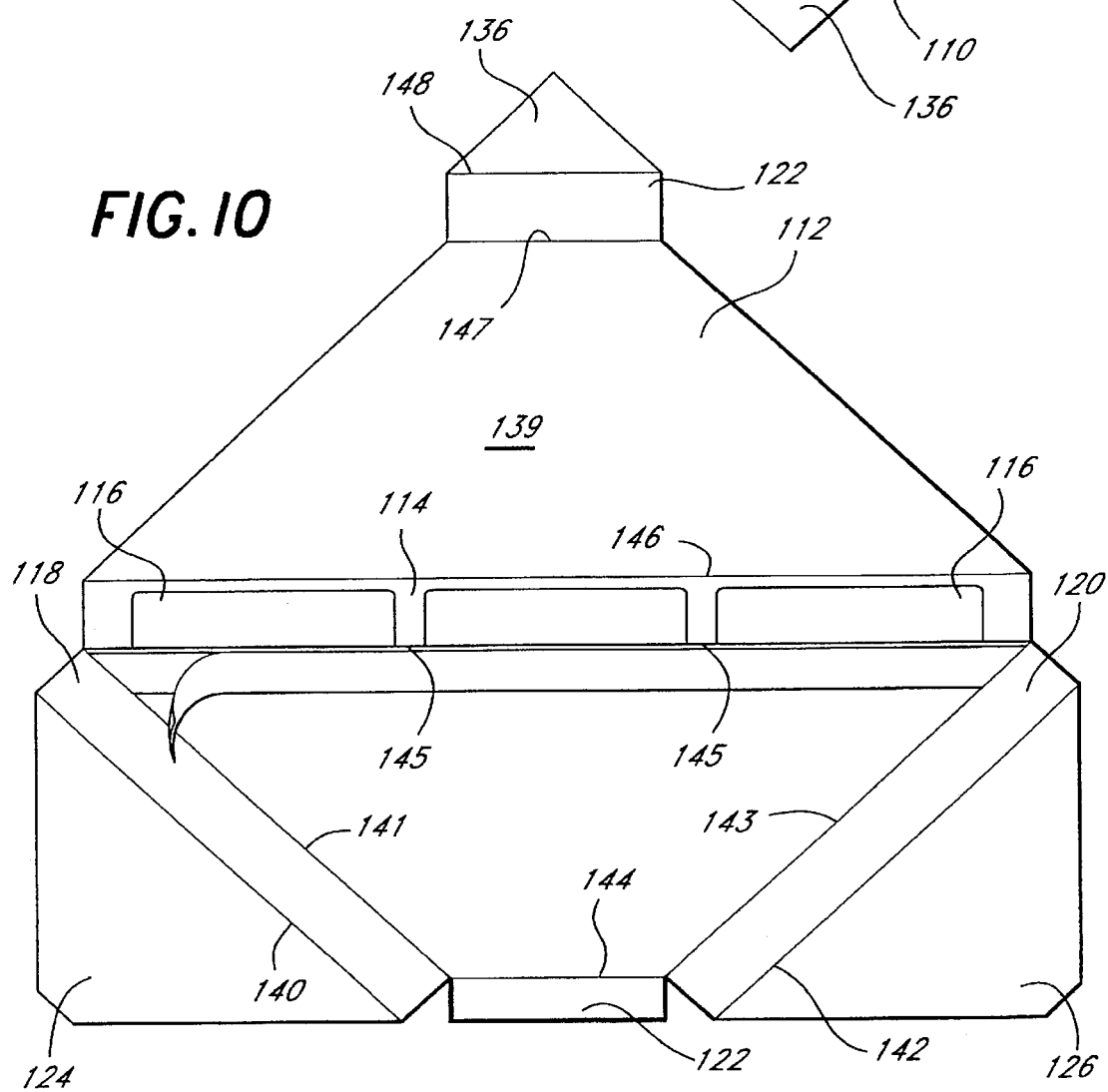

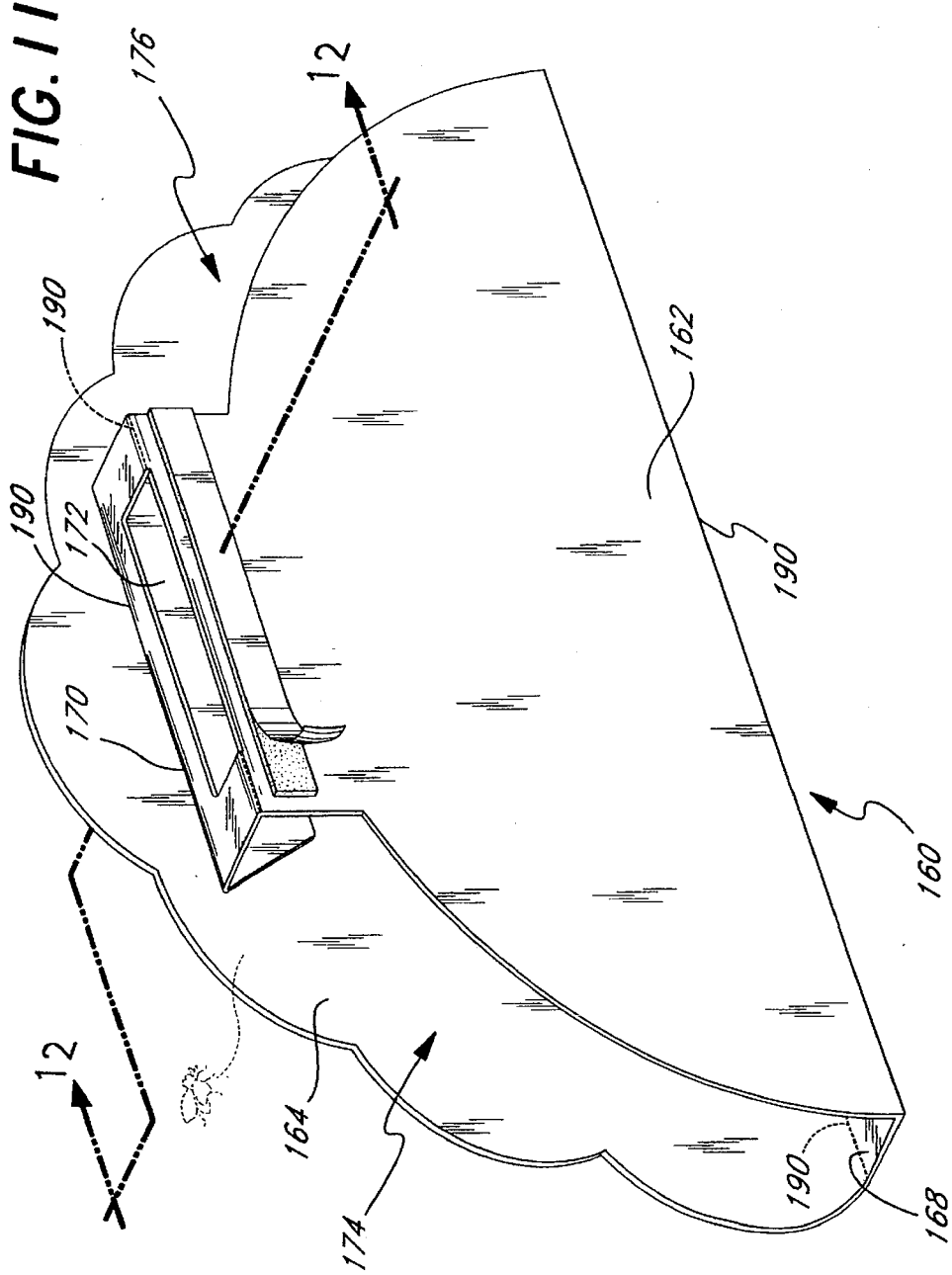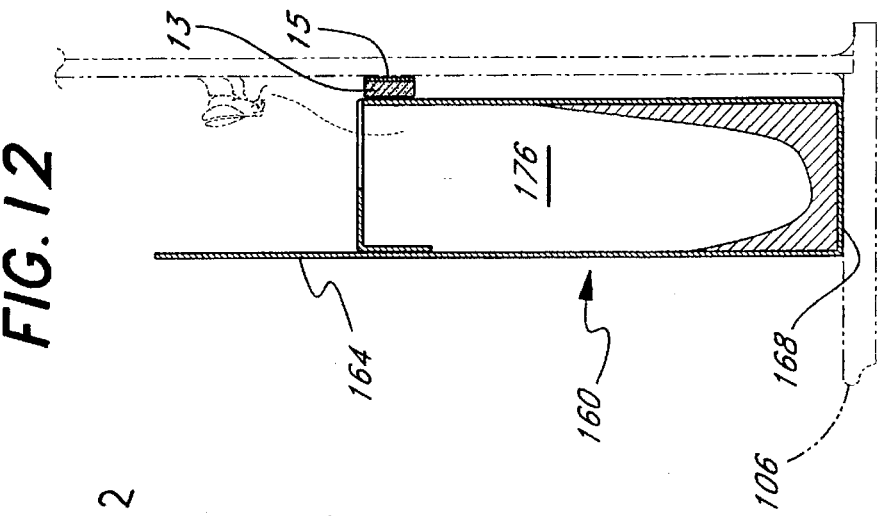

INSECT TRAP AND METHOD

BACKGROUND OF THE INVENTION

1. Field of the Invention

This invention relates to an insect trap adapted to be removably fastened to a window pane or other structure.

2. Background Discussion

The use of insect traps is well known. Typically, an insect trap includes a chamber having an opening that allows insects, such as moths, flies, mosquitoes, etc., to migrate into the trap. There is a sticky substance in the chamber that captures and holds the insect on contact. The insect trap may be removably attached to, for example, a window pane. Typical insect traps are illustrated in the following U.S. Pat. Nos. 4,829,702; 4,876,823; and 5,022,179.

SUMMARY OF THE INVENTION

The object of the present invention is to provide an insect trap which is superior to conventional traps such as illustrated by the above-mentioned patents, and in particular, to provide an insect trap which is easy to manufacture, is compact so that it is convenient to ship and store, is inexpensive, and is simple to use and does not normally expose the user to contact with the insect capturing sticky substance.

The device of this invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include low cost and simplicity of manufacturing, convenience and ease of installation, elimination of the use of a cover sheet for the insect capturing sticky substance, and avoidance of user exposure to the insect capturing sticky substance.

The first feature of the insect trap of this invention is that it is constructed to be folded for storage and unfolded for use. The trap is preferably made from low cost sheet material such as, for example, a paper type product, although other materials such as plastic, for example, vinyl or styrene polymers, may be used. In the folded condition, the trap is in a substantially flat, planar configuration. This enables the insect trap to be shipped and stored with ease. In the unfolded condition, the trap has a three dimensional configuration, with an exterior surface provided by a top, bottom and opposed side walls and an internal chamber defined by these walls. In one embodiment, it has a box-like configuration. In another, it has a truncated, triangular-like configuration. In still another, it has a tunnel-like configuration. There is an entryway to the internal chamber, preferably in the top wall, and preferably this entryway extends substantially along the entire length of the top wall to provide virtually unrestricted access to the internal chamber through the top wall. In one embodiment of the insect trap, upon being unfolded, and when viewed from an end, the trap is open and has the configuration of a quadrilateral such as parallelogram. The angular relationship of adjacent sides of the parallelogram change from about zero or 180 degrees to about 90 degrees as the trap is unfolded.

The second feature of this invention is that the sheet material from which the insect trap is made is a unitary, flat, sheet member. In one embodiment, an elongated sheet is used. The sheet member has a plurality of scorelines which enable side edges of the member to be brought into an overlapping relationship. Simultaneously, the member is folded and unfolded along these scorelines to form the walls of the trap. These score lines act as hinges for these walls. The overlapping edges are bonded together to create a structure which is movable between the folded flat condition and the unfolded condition. The sheet materiel is pre-cut into a predetermined shaped that facilitates quick, low cost manufacture of the insect trap of this invention.

The third feature of this invention is that the internal chamber has a sticky substance therein that captures insects on contact. The sticky substance is near the bottom wall. With the trap in the folded condition, the sticky substance is entirely covered by a wall, which prevents exposure of this substance, so that the user cannot accidentally contact it, thereby avoiding the inconvenience of removing this substance from hands, clothes, etc. Upon unfolding the trap, a web of the substance is form inside the chamber, and the walls of the chamber guard against user contact. This web comprises newly exposed surfaces of the sticky substance. This improves the shelf life of the substance. The web may be in the form of thin, thread-like strands of the sticky substance extending between at least two nearby walls, for example, the bottom wall and a side wall. These strands act like a spider's web to capture any insect which migrates into the internal chamber. Over a period of time the strands tend to slump into a mass near the bottom of the chamber.

The fourth feature of this invention is that there is an adhesive on the exterior of the trap that enables the insect trap to be attached to a support member. Preferably, this adhesive is a strip covered with a removable member, so that the adhesive is exposed only when the trap is to be attached to the support structure.

The fifth feature is that in one embodiment the insect trap is adapted to fit into a corner support member formed by two surfaces intersecting at a right angle, such as the corner of a window. The body member in the unfolded condition has a configuration adapted to fit snug in the corner support member. In the unfolded condition and positioned in the corner support member, the body member has one long side wall with opposed ends and one short side wall with opposed ends. The long side wall is disposed at an angle of 45 degrees with respect to the surfaces of the corner support member, and the short side wall is parallel to the long side wall and is also disposed at an angle of 45 degrees with respect to the surfaces of the corner support member. There are a pair of connecting side walls disposed between the long and short side walls. Each of these connecting side walls has one end connected to one of the opposed ends of the long side wall and another end connected to one of the opposed ends of the short side wall. The connecting walls converge as they approach the intersection of the corner surfaces and are substantially flush with these surfaces. In this embodiment, each of the connecting side walls have a triangular shaped panel folded inward along a score line, but not bonded in a fixed position so that these triangular shaped panels slide in and out relative to the chamber as the body member is moved between folded and unfolded conditions. The short wall preferably has a triangular flap connected thereto which is adapted to fit snug into the corner support member. The body member in the unfolded condition has a box-like configuration.

The sixth feature is that in another embodiment the insect trap in the unfolded condition has a pair of parallel side walls. Each wall extends at substantially right angle outward from a generally flat bottom wall. There is a top wall connecting the parallel side walls, which is substantially parallel to the bottom wall. The body member in the unfolded condition has open ends serving as the entryway to the internal chamber to provide the body member with a tunnel-like configuration.

In accordance with this invention, there is also provided a method of capturing insects that migrate towards the surface of a window pane, or similar structure. It is especially advantageous to mount the insect trap of this invention along an edge of a window pane, because of the natural inclination of insects to migrate to a window pane because of the light when inside a home or other building.

The method of this invention comprises (a) providing an insect trap, including a body member adapted to be folded and unfolded, said body member in the folded condition being in a substantially flat, planar configuration, and in the unfolded condition having a three dimensional configuration with an exterior surface and an internal chamber, said internal chamber having a sticky substance therein that captures insects on contact, an entryway in the body member to the internal chamber, and an adhesive on the exterior of the sheet that enables the insect trap to be attached to the surface of the window pane and the like, (b) unfolding the insect trap and positioning said trap near the window pane and the like with the entryway nearby the surface of the window pane and the like, and (c) fastening said trap to a window pane and the like by pressing the adhesive on the exterior of the body member against the window pane and the like.

The entryway is adjacent the inside of the window pane, so as the insects move to and fro over the surface of the window pane they make their way into the chamber of the trap via the entryway. The trap is preferably placed into position while in the folded condition, and pressure applied to the adhesive to affix the trap to the support member. Once in position, it is then unfolded for use.

DESCRIPTION OF THE DRAWING

The preferred embodiment of this invention, illustrating all its features, will now be discussed in detail. This embodiment depicts the novel and non-obvious insect trap and method of this invention shown in the accompanying drawing, which is for illustrative purposes only. This drawing includes the following figures (FIGS.), with like numerals indicating like parts:

FIG. 1 is a perspective view of the first embodiment of the insect trap of this invention shown in the unfolded condition.

FIG. 2A is a cross-sectional view taken along line 2A—2A of FIG. 1, with the insect trap positioned adjacent a window pane, but not squared up with the intersecting surfaces of the window frame and window pane.

FIG. 2B is a cross-sectional view similar to that shown in FIG. 2A, with the insect trap positioned adjacent a window pane, and squared up with the intersecting surfaces of the window frame and window pane.

FIG. 2C is a cross-sectional view of a second embodiment of the insect trap similar to that shown in FIG. 2A, with the insect trap positioned adjacent a window pane, but having side walls that are not parallel.

FIG. 3 is a cross-sectional view, with sections broken away, taken along line 3—3 of FIG. 1.

FIG. 4 is a fragmentary, plan view of the paper type member from which the first embodiment of the insect trap of this invention is made in a disassembled condition and lying on a flat surface.

FIG. 5 is a plan view of the first embodiment of the insect trap of this invention in a folded, generally flat condition.

FIG. 6 is an end view taken along line 6—6 of FIG. 5.

FIG. 7 a perspective view of a third embodiment of the insect trap of this invention positioned to be inserted into the corner of a window.

FIG. 8 is another perspective view of the insect trap shown in FIG. 7 inserted into the corner of the window.

FIG. 9 is a plan view of the third embodiment shown in FIGS. 7 and 8 in a folded condition.

FIG. 10 is a plan view of a precut sheet material from which the third embodiment shown in FIGS. 7 and 8 is made.

FIG. 11 is a perspective view of a fourth embodiment of the insect trap of this invention.

FIG. 12 is a cross sectional view taken along line 12—12 of FIG. 11.

DESCRIPTION OF THE PREFERRED EMBODIMENTS

As best illustrated in FIGS. 1–3, the insect trap 10 of this invention has a body member 10a made from a generally flat sheet material 12 (FIG. 4), for example, coated cardboard such as sold by Ingram Corporation under the trademark SPRINGHILL C2S. The insect trap 10 is in a folded condition (FIG. 6) for storage and shipment, and unfolded for use (FIG. 1). When unfolded, the trap 10 has a top wall 6, a bottom wall 7, and a pair of opposed side walls 8 and 9. There is an entryway 22, comprising a series of rectangular openings 22a and 22b, in the top wall 6 which provides access to an internal chamber 17 (FIG. 2) within the trap 10. This entryway 22 extends substantially along the entire length of the top, with narrow support arms 28 extending between a rear portion 6a of the top wall 6 of the trap 10 and the side wall 9 that do not significantly impede the entry of an insect into the chamber 17. Consequently, the entryway 22 provides virtually unrestricted access to the internal chamber 17.

Upon being unfolded, the first embodiment of the insect trap 10, when view from its end (FIGS. 1 and 2A and 2B), has the configuration of a parallelogram. The angular relationship of the side walls 6 through 9 of the parallelogram or trap 10 change from about zero or 180 degrees to about 90 degrees as the trap is unfolded and assumes the condition depicted in FIGS. 1 and 2B. In FIG. 2B the insect trap 10 is positioned adjacent a window pane 52, and squared up flush with the intersecting surfaces of a window sill 50 and the window pane. In FIG. 2A the trap 10 is shown positioned adjacent a window pane 52, but not squared up with the intersecting surfaces of the window sill 50 and window pane 52. This is the preferred arrangement, so that the top wall 6 faces inward slightly at an acute angle with respect to the window pane 52. In FIG. 2C a second embodiment is depicted where the walls are arranged in a quadrilateral configuration as opposed to a parallelogram configuration.

In the parallelogram configuration, when the trap 10 is in the unfolded condition, the side walls 8 and 9 extend downward from the top wall 6 and are parallel to each other, and the bottom wall 7 is parallel to the top wall 6. Along the exterior of the side wall 9 is an adhesive strip 13 which has a removable cover 15 that exposes the strip upon removal.

Along the inside of the bottom wall 7, preferably extending between this bottom wall and a side wall, either side wall 8 or 9, is a sticky, gell-like substance such as a hot melt glue manufactured by the Findley Company of Wauwatosa, Wis. This sticky substance is covered by the side wall 9 when the trap 10 is in the folded condition. When the trap 10 is unfolded the sticky substance is activated. Upon initially unfolding of the trap 10, the sticky substance forms a spider-like web 30 comprising thread-like strands 32 of this substance extending, for example, between the inside surfaces of the chamber 17. Over time the sticky substance slumps or congeals as depicted in FIGS. 2A through 2C. When an insect enters the trap 10 and contacts this substance, it is inescapably captured within the chamber 17 of trap 10.

The insect trap 10 is very easy to manufacture. Using a conventional paper cutting tool (not shown) such as a metal ruled die, the sheet material 12 is scored with four scorelines 18a, 18b, 19, and 20 and the entryway 22 is cut into the sheet material between the scorelines 18 and 19. As shown in FIG. 4, the exterior surface 16 of the sheet material 12 is scored with the scorelines 18 through 20 that run the length of the sheet material, parallel to each other and to the central longitudinal axis of the sheet material. These scorelines 18 through 20 penetrate into the body of the sheet material 12 a slightly, preferably not exceeding a depth of 25% of the thickness of the sheet material. Typically, the sheet material 12 has a thickness ranging between about 0.007 and 0.050 inch. Consequently, the structural strength of the sheet material 12 is not unduly diminished by the scorelines 18 through 20. The outer edges edges 40 and 42 of the sheet material 12 are brought into an overlapping condition and bonded together (FIG. 2), for example, by gluing, so that the generally box-like or tunnel-like, configuration is provided when the insect trap 10 is unfolded. As shown in FIG. 1, when the trap 10 is in an unfolded condition, the scoreline 18a is contiguous with the corner 24, the scoreline 19 is contiguous with the corner 25, and the scoreline 20 is contiguous with the corner 26. The outer edges of the openings 22a and 22b are contiguous with the corner 29. The narrow arms 28 are automatically creased at the corner 29 when the trap 10 is unfolded.

As shown in FIG. 2, the trap 10 when used is preferably placed on the window sill 50 with the bottom wall 7 resting on the sill 50, and the uncovered adhesive strip 13 pressed against an adjacent window pane 52 to removably attach the insect trap 10 to the window pane. The entryway 22 is near the window pane 52, allowing an insect which is moving over the surface of the window pane to enter the trap 10. The trap 10 is easily removed from the window pane 52 by pulling it away from the window pane. It can then be discarded. The sticky substance is never exposed, thereby avoiding user contamination.

The third embodiment of this invention, insect trap 100, shown in FIGS. 7 through 10, is particularly adapted to fit into a corner support member 102 such as the intersecting surfaces of a window pane 104, window sill 106, and window side 108. The trap 100 had a generally box-like configuration in the form of a triangle with its apex truncated. As shown in FIGS. 7 and 8, the trap 100 is unfolded to display a front wall 110, a rear wall 112, a top wall 114 with openings 116 therein to provide an entry way for an insect, a pair of side walls 118 and 120 that converge inwardly towards the corner where the window pane 104, window sill 106, and window side 108 meet, and a bottom wall 122 which is parallel to the top wall. As shown in FIG. 10, there is a panel 122a attached to the bottom wall 122 which is bonded to the inside of the front wall 110. Both the top wall 114 and bottom wall 122 form an angle of 45 degrees with respect to the window sill 106. There are two internal panels 124 and 126 which have a generally triangular configuration as best shown in FIG. 10 that are folded inward into an internal chamber 130 inside the trap 100. An sticky substance (not shown) which captures insects entering the trap 100 is located within the chamber 130 along the side walls 118 and 120 and bottom wall 122. A triangular flap 136 is extends outward from the front wall 110 which fits snug into the corner. An adhesive strip 13 with a removable cover 15 is used to attach the trap to the window pane 104.

Like the embodiment depicted in FIGS. 1 through 6, the trap 100 is made from a unitary sheet material 139 which has a plurality of score lines 140 through 148 that serve as hinges about which the different walls are folded. The score lines 140 and 141 and 142 and 143 define, respectively, the side walls 118 and 120. The score lines 145 and 146 define the top wall 114. The score lines 147 and 148 define the bottom wall 122. With the panel 148 folded inward and bonded to the inside of front wall 110, and the panels 124 and 126 folded inward into the chamber 130, the trap 100, in the unfolded condition, has a box-like configuration as shown in FIGS. 7 and 8. The trap 100 is shown in the folded condition in FIG. 9.

The fourth embodiment, trap 160, shown in FIGS. 11 and 12 has a generally tunnel-like configuration when unfolded. Trap 160 has two generally parallel walls 162 and 164 which extend outwardly from a bottom wall 168. A top wall 170 parallel to the bottom wall 168 includes, optionally, an opening 172. In this configuration the ends 174 and 176 are open so that an insect may enter the trap 160 from many different angles. An adhesive strip 13 provided with a cover member 15 allows the trap 160 to be fastened to a window pane 104 as shown in FIG. 12. A sticky substance 32 near the bottom wall 168 captures the insect. Preferably the exterior wall 164 is larger than the interior wall 162 and can be cut into any desirable configuration such as, for example, scalloped edges, clowns, flowers, or possibly in the form of an animal such as a lion, teddy bear, tigers, etc. The parallel walls 162 and 164, the bottom wall 168, and the top wall 170 all have at there edges score lines 190 which act as hinges that enable the trap 160 to be folded for storage and unfolded for use.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

I claim:

1. An insect trap adapted to fit into a corner support member formed by two surfaces intersecting at a fight angle, comprising body member made of a sheet member which has overlapping edges that are bonded together and a plurality of scorelines therein which enable the sheet member to be folded and unfolded along said score lines to form side walls, said body member being movable between folded and unfolded conditions, with the score lines serving as hinge elements for the side walls, said body member in the folded condition being in a substantially flat, planar configuration and in the unfolded condition having a three dimensional configuration with an exterior surface and internal surface, said side walls forming an internal chamber when the body member is in the unfolded condition, said body member in the unfolded condition having a configuration adapted to fit snug in said corner support member with one long side wall with opposed ends, said long side wall being disposed at an angle of 45 degrees with respect to the surfaces of the corner support member, one short side wall with opposed ends, said short side wall being parallel to said long side wall and disposed at an angle of 45 degrees with respect to the surfaces of the corner support member, and a pair of connecting side walls disposed between the long and short side walls, each of said connecting side walls having one end connected to the opposed ends of the long side wall and another end connected to the opposed ends of the short side wall, said connecting walls converging as they approach the intersection of said surfaces and being substantially flush with the surfaces of the corner support member, said internal chamber having a sticky substance therein that captures insects on contact, an entryway in the body member that provides access to the internal chamber, an adhesive on the exterior of the body member that enables the insect trap to be attached to a support member.

2. The insect trap of claim 1 where each of said connecting side walls have a triangular shaped panel folded inward along a score line, but not bonded in a fixed position so that said triangular shaped panels slide in and out relative to the chamber as the body member is moved between folded and unfolded conditions.

3. The insect trap of claim 1 where the short wall has a triangular flap connected thereto which is adapted to fit snug into the corner support member.

* * * * *